S. J. Talbott,
Bread Machine,
No. 60,652. Patented Dec. 18, 1866.

Witnesses,

Inventor,
S. J. Talbott

United States Patent Office.

IMPROVED DOUGH-MIXER.

S. J. TALBOTT, OF MILFORD, NEW HAMPSHIRE.

Letters Patent No. 60,652, dated December 18, 1866.

*The Schedule referred to in these Letters Patent and making part of the same.*

TO ALL WHOM IT MAY CONCERN:

Be it known that I, S. J. TALBOTT, of Milford, in the county of Hillsborough, and State of New Hampshire, have invented a new and useful improvement in Dough-Mixers and Kneaders; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved machine for mixing and kneading dough, which shall be easy to be operated, easy to be cleaned, not liable to get out of order, and which will do the work well; and it consists of a tapering can, having a double metallic cover, and pivoted in a frame by a hoop provided with trunnions and a handle, by means of which it is operated, and in the combination, with said handle and frame, of a hook to hold the mixer stationary when desired, the whole being constructed and arranged as hereinafter more fully described.

Figure 1:
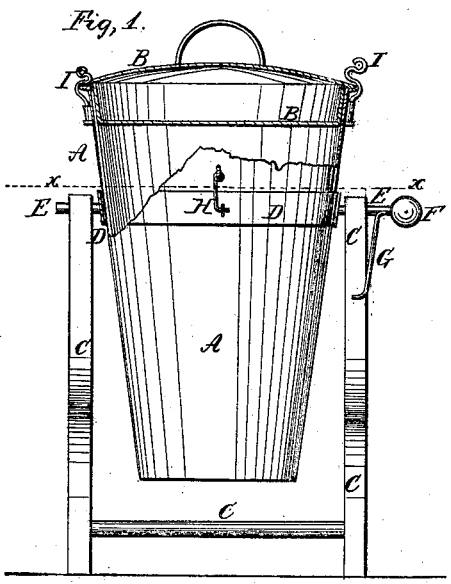
Figure 1 is a side view of my improved dough-mixer, part being broken away to show the construction.
Figure 2:
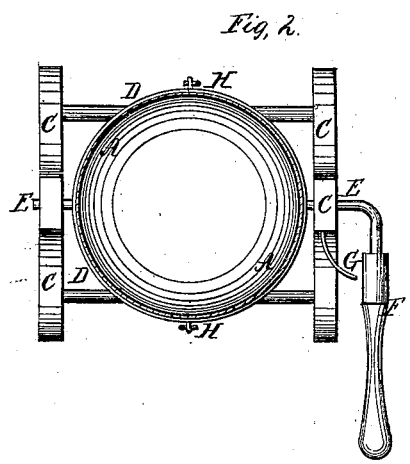
Figure 2 is a horizontal section of the same taken through the line $x\ x$, fig. 1.

A is the can, which I generally make from twelve to eighteen inches deep and in the form shown in the drawings. B is a metallic cover, which is made double, as shown in fig. 1, so as to fit closely into the upper part of the can, A, to guard against any of the flour or dough finding its way out around said cover. C is the frame in which the mixer or kneader is pivoted, which may consist of two uprights set at the proper distance apart and securely connected to each other at their lower ends by horizontal bars. The particular form and construction of the frame, C, is immaterial so long as its upper part is left free for the mixer to oscillate. D is a hoop of such size as to fit around the can, A, at about its middle part. To the opposite sides of the hoop, D, are securely attached trunnions, E, which work in bearings in the upper part of the frame, C, as shown in fig. 1. If desired, the trunnions, E, may be attached directly to the sides of the can, A, or the mixer may be pivoted to the frame in any other convenient manner; but I prefer the manner first described, as being more convenient, and leaving the can in better shape to be cleaned and washed. To the projecting end of one of the trunnions, E, is attached, or upon it is formed, a handle, F, by means of which the mixer is oscillated. G is a hook, one end of which is pivoted to the frame C, and the other end or hook hooks into the handle F, and holds the mixer stationary and in an erect position, when desired. The can A is secured in place in the hoop D, by hooks H, which are attached to the sides of said can and hook into eyes attached to the sides of the hoop F, as shown in the drawings. The cover B is secured in place upon the can A by buttons or hooks I, pivoted to the sides of the can, and which shut over the edge of the said cover, as shown in fig. 1, or it may be secured in any other convenient manner that will accomplish the same object; that is to say, will hold the cover securely against the pressure of the dough as it is thrown from one end of the said can to the other by the oscillation of the mixer.

What I claim as new, and desire to secure by Letters Patent, is—

An oscillating dough-mixer, consisting of the can A, double metallic cover B, hoop D, trunnions E, handle F, hooks G H, and frame C, constructed and operating in the manner as and for the purpose specified.

S. J. TALBOTT.

Witnesses:
L. C. BILLINGS,
J. L. SPRING.